(12) United States Patent
Wilhelmsson et al.

(10) Patent No.: US 11,661,881 B2
(45) Date of Patent: May 30, 2023

(54) DETECTION OF DIFFERENTIAL PRESSURE SENSOR REPLACEMENT

(71) Applicant: VOLVO TRUCK CORPORATION, Gothenburg (SE)

(72) Inventors: Martin Wilhelmsson, Gothenburg (SE); Mattias Johansson, Torslanda (SE); Martin Strängberg, Gothenburg (SE); Carl Fredrik Mannerfelt, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/935,666

(22) Filed: Sep. 27, 2022

(65) Prior Publication Data

US 2023/0106305 A1    Apr. 6, 2023

(30) Foreign Application Priority Data

Oct. 4, 2021   (EP) .................................... 21200645

(51) Int. Cl.
*F01N 11/00* (2006.01)
*G01L 13/00* (2006.01)

(52) U.S. Cl.
CPC ............ *F01N 11/005* (2013.01); *G01L 13/00* (2013.01); *F01N 2550/04* (2013.01)

(58) Field of Classification Search
CPC .......... F01N 3/021; F01N 3/035; F01N 11/00; F01N 11/002; F01N 11/005; F01N 9/002; F01N 2550/00; F01N 2550/04; F01N 2560/05; F01N 2560/08; F01N 2900/1406; G01L 13/00; G01L 15/00; F02D 41/029; F02D 41/1449; F02D 41/222; F02D 2200/0812
See application file for complete search history.

(56) References Cited

U.S. PATENT DOCUMENTS

| 8,640,441 | B2 * | 2/2014 | Tylutki | ................. F02D 41/222 60/276 |
| 8,966,882 | B2 | 3/2015 | Fylutki et al. | |
| 10,287,957 | B2 * | 5/2019 | Nakata | ..................... F01N 9/002 |

(Continued)

FOREIGN PATENT DOCUMENTS

DE    102009057735 A1    7/2010

OTHER PUBLICATIONS

Extended European Search Report in corresponding European Application No. 21200645.6 dated Mar. 30, 2022 (5 pages).

*Primary Examiner* — Audrey B. Walter
*Assistant Examiner* — Dapinder Singh
(74) *Attorney, Agent, or Firm* — Venable LLP; Jeffri A Kaminski

(57) ABSTRACT

A method for detecting a replacement of a differential pressure sensor arranged for measuring a differential pressure across a filter of an aftertreatment system of a vehicle. The method includes determining a sensor offset value being an offset from a sensor value measured with a differential pressure sensor; adding an adaption value to the measured sensor value to compensate for the offset value to centre the sensor value around a predetermined level; if a sum of a subsequently measured sensor value and the adaption value exceeds a limit value, concluding that the differential pressure sensor has been replaced.

15 Claims, 5 Drawing Sheets

(56) References Cited

U.S. PATENT DOCUMENTS

| | | | |
|---|---|---|---|
| 10,933,363 B2* | 3/2021 | Wunderlich | B01D 46/0086 |
| 10,937,258 B2 | 3/2021 | Anderson et al. | |
| 2012/0297750 A1* | 11/2012 | Sun | F01N 3/023 |
| | | | 73/23.33 |
| 2013/0327018 A1 | 12/2013 | Tylutki et al. | |
| 2014/0069081 A1 | 3/2014 | Tylutki et al. | |
| 2020/0111271 A1 | 4/2020 | Anderson et al. | |

* cited by examiner

DETECTION OF DIFFERENTIAL PRESSURE SENSOR REPLACEMENT

TECHNICAL FIELD

The present disclosure relates to a method for detecting a replacement of a differential pressure sensor arranged for measuring a differential pressure across a filter of an aftertreatment system of a vehicle. The present disclosure also relates to a corresponding exhaust aftertreatment system, a control unit, and a computer program. Although the method and system will be described in relation to a vehicle in the form of a truck, the method and system can also be efficiently incorporated in other vehicles types such as e.g., buses and construction equipment.

BACKGROUND

All modern exhaust aftertreatment systems are equipped with a particulate filter to capture particles such as soot and ash from the engine combustion.

To monitor the soot and ash load in the particulate filter, it is common practice to measure a differential pressure over the particulate filter using pressure sensors. When the differential pressure is higher than some threshold a soot regeneration process for the filter is often performed. A measured differential pressure is also used in performing On-Board-Diagnostics (OBD) of the particulate filter.

It is important to correctly diagnose the pressure sensors, so that the present status of the particulate filter can be established. For example, if there is a constant offset in the signal coming from the pressure sensor, then that offset will need to be handled by a control system. One method to handle a potential offset is to monitor the signal value when the engine is off, and the vehicle is in a "key-on" position. If the signal at that point in time differs from zero, then the sensor signal may be compensated to be centred around zero.

However, if a large compensation value was recently added to the sensor signal to compensate for an offset, and the sensor is replaced, then all functions that depend on the compensated sensor signal must be reset. Once a sensor is replaced, such reset is performed at a workshop. However, if such reset is not performed, there is a risk that the vehicle will incorrectly interpret the signal value with the added offset as the actual value from the sensor. This could risk triggering an OBD fault for one or several OBD monitors such as an OBD monitor for the particulate filter or for the pressure sensor itself. Accordingly, it would be useful with a method that enables to detect that a pressure sensor has been replaced.

SUMMARY

An object of the invention is to provide a method for detecting a replacement of a differential pressure sensor arranged for measuring a differential pressure across a filter of an aftertreatment system of a vehicle that at least partly alleviates the deficiencies with the prior art.

According to the first aspect of the invention, there is provided a method for detecting a replacement of a differential pressure sensor arranged for measuring a differential pressure across a filter of an aftertreatment system of a vehicle, the method comprising: determining a sensor offset value being an offset from a sensor value measured with a differential pressure sensor; adding an adaption value to the measured sensor value adapted to compensate for the offset value to centre the sensor value around a predetermined level; if a sum of a subsequently measured sensor value and the adaption value exceeds a limit value, concluding that the differential pressure sensor has been replaced.

The present invention may be based on the realization that if a first differential pressure sensor is replaced with a new differential pressure sensor, and a software reset is not performed e.g., at the workshop to reset the offset compensation, then the adaption value used for the first differential pressure sensor will cause an offset from the intended centre value at the predetermined level for the new differential pressure sensor. Thus, the adaption value used for compensating for a sensor offset of the first differential pressure sensor does no longer centre the sensor value at the predetermined level. Therefore, if a sum of a subsequently measured sensor value and the adaption value is too large, either positive or negative, and exceeding the limit value, then it can be concluded that a new differential pressure sensor has been installed to replace the first differential pressure sensor.

The adaption value has a sign opposite from the sign of the offset of the sensor value. In this way, if the adaption value is added to the sensor value, the compensated sensor value is at the predetermined level, preferably at or near zero. For example, if the sensor offset is positive with respect to the predetermined level then the adaption value is negative with respect to the predetermined level, thereby leading to a sum between a positive sensor value and a negative adaption value. If the sensor offset is negative with respect to the predetermined level then the adaption value is positive with respect to the predetermined level, thereby leading to a sum between a negative sensor value and a positive adaption value.

A new differential pressure sensor typically has no or only a small offset from zero. Therefore, the predetermined level is preferably at or near zero. In this way, if a new differential pressure sensor, with small or no offset from zero, has replaced a prior differential pressure sensor with large offset which was compensated for by adding an adaption value, the sum between the new sensor value and the adaption value is no longer at or near zero. If this sum exceeds the limit value, which can be either a positive or negative value, a sensor replacement can be concluded.

Thus, by the provision of the herein proposed method, a sensor replacement can be concluded by measurements of sensor values so that a software reset can be timely performed. In this way, reduced downtime of the vehicle is possible since the risk of having to bring the vehicle back to the workshop is reduced. Further, improved reliability for on-board functions relying on accurate differential pressure sensor values is achieved.

The aftertreatment system is adapted to receive combustions gas from an engine preferably being an internal combustion engine. The internal combustion engine may be diesel engine or a gasoline engine or any other type of internal combustion engine. The internal combustion engine may be part of a hybrid driveline partly powered by a battery.

The limit value may be adapted to the specific type of vehicle and aftertreatment system at hand. Generally, that the sum of a subsequently measured sensor value and the adaption value does not exceed the limit value indicates that the sum does not deviate more than acceptable from the predetermined level. More specifically, the limit value should be adapted such that if the sum of a subsequently measured sensor value and the adaption value does not exceed the limit value, functions relying on the sensor values can operate properly.

The limit value may be adapted to the specific application and operation parameters thereof. For example, the limit value may depend on the specific calibration of soot and ash models and on diagnostics monitoring functions of the aftertreatment system. The limit value may also depend on the specific type of differential pressure sensor and its characteristics. Generally, the limit value may be a trade-off between accumulating too much soot in the filter and the risk of receiving a high rate of fault codes.

The filter may be a particulate filter of the aftertreatment system configured to capture particles such as soot and ash from the engine combustion. In case of a diesel engine, the filter is a diesel particulate filter (DPF).

According to an example embodiment, the method may be performed only once predefined conditions of the vehicle are fulfilled. Hereby, it is ensured that the vehicle conditions are in a state where the sensor values are not affected by factors that may cause a faulty detection of a sensor replacement. For example, the sensor values should be measured at similar vehicle conditions to ensure a sufficiently accurate determination of a sensor value offset, and sums of adaption values and subsequently measured sensor values.

Various predefined conditions of the vehicle are conceivable, and in some embodiments, the predefined conditions may include at least one of that the vehicle engine is off, the vehicle engine is idle, a temperature of the filter is within a predetermined range, and that the ambient temperature is within a predetermined range. That the engine is off provides the advantageous condition that no mass flow is present in the aftertreatment system whereby the sensor values are not affected by varying levels of pressure across the filter. Preferably, the predefined conditions are such that the particulate filter is warm, e.g., warmer than ambient temperatures, and that the differential pressure sensor is not exposed to water. Thus, when the engine is off, it may recently have been running so that the filter is relatively warm. The predetermined temperature range of the filter should be higher than a temperature that ensures water in the filter or on the pressure sensor can be avoided, but preferably below a regeneration temperature of the filter. The ambient temperature should preferably be at a temperature, above freezing, so that the pressure sensor can provide accurate readings.

According to an example embodiment, the method may comprise, in response to concluding that the differential pressure sensor has been replaced, performing a reset of at least one software function affected by the pressure values measured by the differential pressure sensor. Such reset may include to reset the adaption value to centre the subsequently measured sensor value at the predetermined level. Advantageously, this reset may be performed automatically at detection of a new differential pressure sensor. Thus, the risk of forgetting, or for other reasons not performing the software reset at the workshop, is reduced, or even eliminated.

A reset is considered a reset of the model or function to its predefined state at start up, with predefined parameters of the model or function.

According to an example embodiment, the at least one software function may comprise at least one of a sensor adaption function configured to perform sensor value offset compensation, a particulate filter soot or ash model, or an on-board diagnostic monitor function of the vehicle. For example, historical data used for any one of the functions or models are reset to better adapt to the new differential pressure sensor. A sensor adaption function is configured to apply the adaption value to sensor values provided by the differential pressure sensor.

According to an example embodiment, the method may comprise, in response to concluding that the differential pressure sensor has been replaced, pausing an operation of at least one of a particulate filter soot or ash model and the on-board diagnostic monitor function of the vehicle until reset of the of at least one software function is completed. Hereby, faulty operations of the functions using the differential pressure sensor values are avoided.

According to an example embodiment, the method may comprise in response to detecting that the sum of the subsequently detected sensor value and the adaption value exceeds the limit value, providing a signal to a user interface indicative of that a differential pressure sensor replacement is detected, and triggering a request for confirmation of a differential pressure sensor replacement. In other words, an indication may be sent to a user interface, such as a computer device in a workshop or a portable electronic device of a user or technician, providing an indication that a new sensor is detected. In response, the user or technician can provide confirmation to a vehicle control unit via the user interface that the sensor has been replaced, whereby a software reset is initiated, either automatically by the vehicle control unit in response to the confirmation, or manually by the user or technician.

According to an example embodiment, the method may comprise, in response to receiving a confirmation of a differential pressure sensor replacement, performing a reset of at least one software function affected by the pressure values measured by the differential pressure sensor. The software reset is initiated, either automatically by the vehicle control unit in response to the confirmation, or manually by the user or technician.

According to an example embodiment, the method may comprise storing the adaption value in a memory. This allows to apply the previous adaption value if a new adaption value calculated after a software reset is determined based on incorrect input data.

Preferably, the predefined level is at or near zero which advantageously reflects a zero, or near zero offset of most new differential pressure sensors.

According to the second aspect of the invention, there is provided an exhaust aftertreatment system of a vehicle comprising: a particulate filter configured to capture particulates in a stream of combustion gas from a vehicle engine; a differential pressure sensor arranged to measure the pressure drop across the particulate filter; and, a control unit configured to detect a replacement of the differential pressure sensor by determining a sum of a measured sensor value and an adaption value adapted to compensate for an offset sensor value to centre a measured sensor value around a predetermined level, wherein if the sum exceeds a limit value, the control unit is configured to conclude that the differential pressure sensor has been replaced.

Effects and features of the second aspect of the invention are largely analogous to those described above in connection with the first aspect.

According to a third aspect of the invention, there is provided a vehicle comprising the exhaust aftertreatment system according to the second aspect.

According to a fourth aspect of the invention, there is provided a computer program comprising program code means for performing the steps of the first aspect when the program is run on a computer.

According to a fifth aspect of the invention, there is provided a computer readable medium carrying a computer program comprising program code means for performing the steps of the first aspect when the program product is run on a computer.

According to a sixth aspect of the invention, there is provided a control unit detecting a replacement of a differential pressure sensor, the control unit being configured to perform the steps of the method according to the first aspect.

Effects and features of the third, fourth, fifth, and sixth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
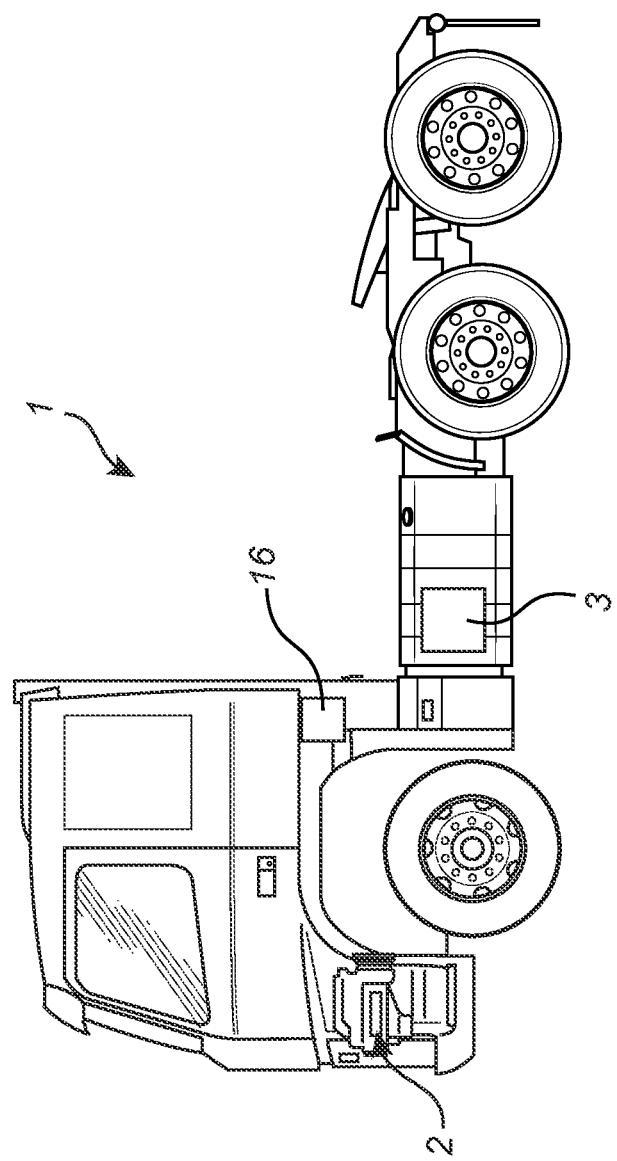
FIG. 1 is a vehicle in the form a truck according to example embodiments of the invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The skilled person will recognize that many changes and modifications may be made within the scope of the appended claims.

Like reference character refer to like elements throughout the description.

FIG. 1 illustrates a vehicle in the form of a truck 1 comprising an engine 2 such as for example an internal combustion engine. The internal combustion engine may be e.g., a diesel engine, hydrogen engine or a gasoline engine or any other type of internal combustion engine. The truck 1 may be a hybrid electric vehicle. The truck 1 further comprises an exhaust gas aftertreatment system 3 including e.g., particulate filters, catalytic devices, urea injectors, and nitrogen oxide sensors, etc. The specific configuration of the aftertreatment system 3 depends on the type of vehicle and implementation details thereof. The truck 1 further comprises a control unit 16 that will be discussed with reference to subsequent drawings.

Figure 2:
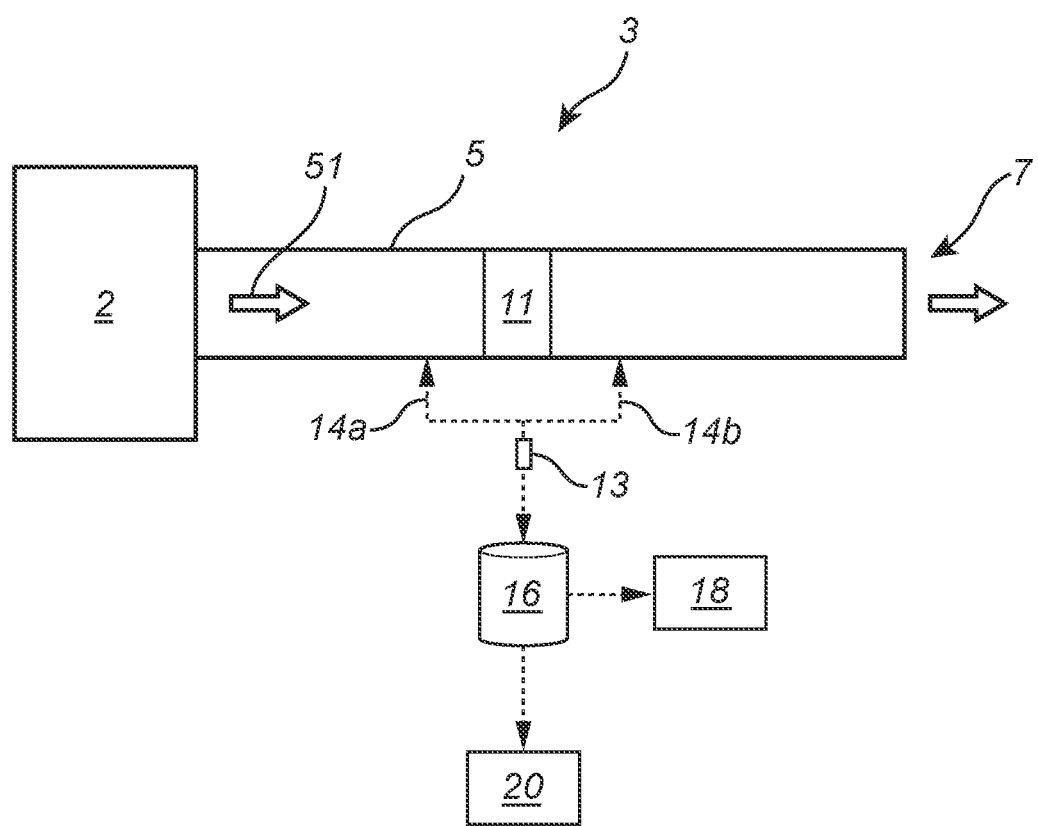
FIG. 2 is a schematic illustration of an exhaust aftertreatment system according to example embodiments of the invention.

FIG. 2 conceptually illustrates an exhaust aftertreatment system 3 according to embodiments of the invention. The exhaust aftertreatment system 3 comprises an exhaust pipe section 5 for transferring exhaust gas 51 towards an exhaust gas outlet 7. The exhaust pipe section 5 is part of a larger transfer system for transferring exhaust gas from the engine 2 to the exhaust gas outlet 7. Generally, the aftertreatment system 3 may comprise catalytic units (e.g., selective catalytic reduction devices), urea injectors, ammonia-slip catalysts, diesel oxidation catalyst, particulate filters, exhaust gas temperature sensors, and other components that are per se known to the skilled person and will not be described in detail herein.

The exhaust aftertreatment system 3 comprises a particulate filter 11 arranged in the exhaust pipe section 5 for capturing particulates in the stream of combustion gas 51. Further, a differential pressure sensor 13 is arranged to measure a pressure drop across the particulate filter 11. The differential pressure sensor 13 is shown configured with one measurement point 14a upstream and one measurement point 14b downstream the particulate filter 11 in the exhaust stream. The differential pressure measurement may equally well be performed using two separate absolute pressure measurement sensors, one arranged at the location 14a upstream of the filter 11 and another one at the location 14b downstream of the filter, wherein the difference between the sensor values obtained by the two absolute pressure measurement sensors provides the differential pressure sensor value.

There is further conceptually shown a control unit 16 configured to receive sensor data from the differential pressure sensor 13. The control unit 16 is further connected with a user interface 18 and a memory 20 which will be discussed further herein.

Figure 3:
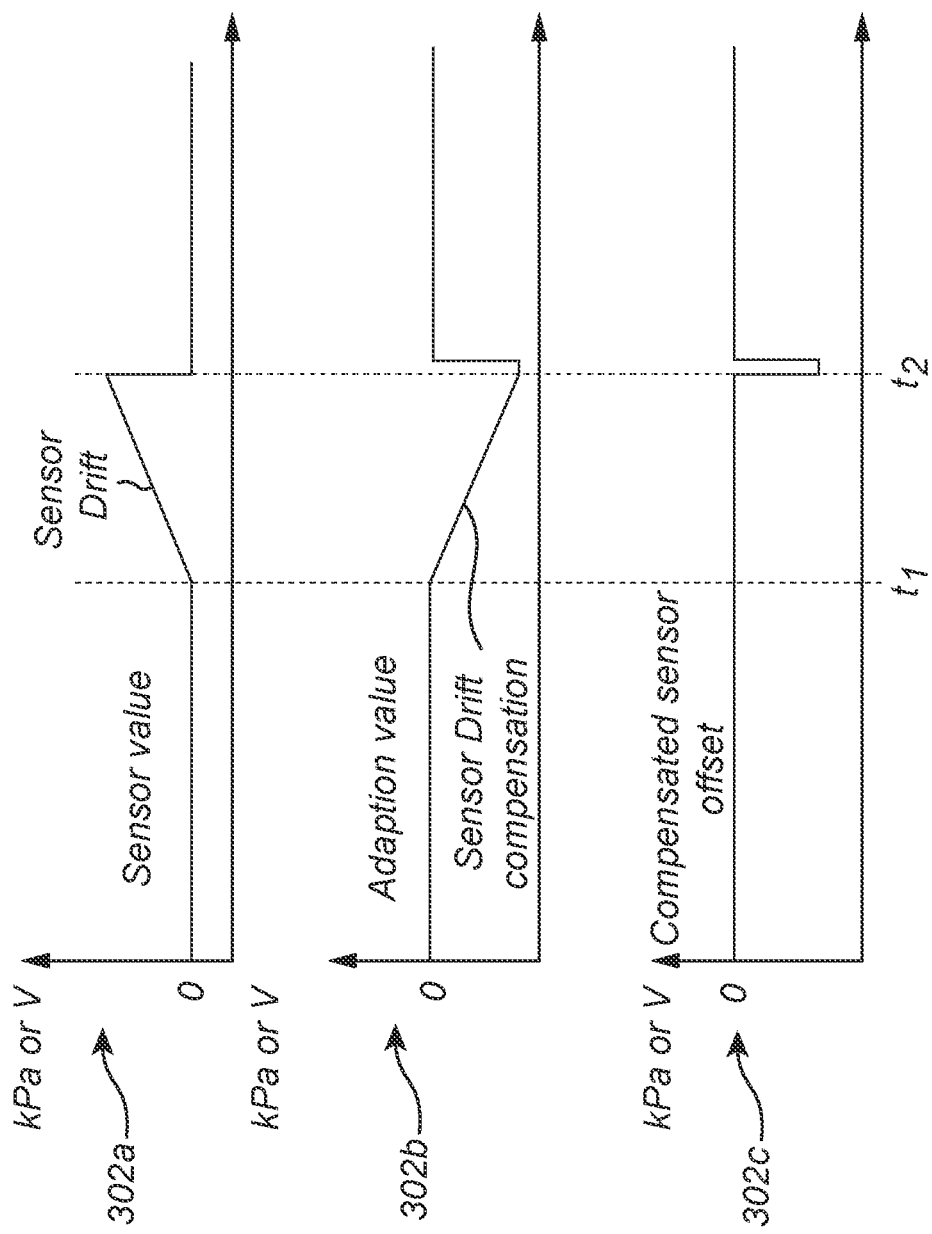
FIG. 3 is a set of graphs conceptually illustrating the methodology according to example embodiments of the invention.
Figure 4:
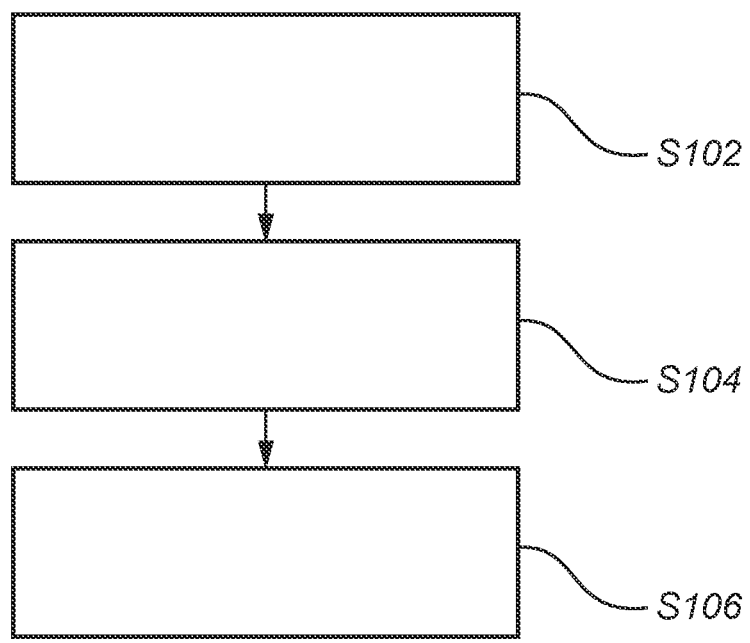
FIG. 4 is a flow-chart of method steps according to example embodiments of the invention.

FIG. 3 conceptually illustrates the methodology according to embodiments of the invention, and FIG. 4 is a flow-chart of method steps according to embodiments of the invention.

The graph 302a of FIG. 3 illustrates a differential pressure sensor value as a function of time and graph 302b is the adaption value as a function of time. The sensor and adaption values are here exemplified in units of voltage or pascal. The differential pressure sensor 13 is arranged to measure the pressure drop across a filter 11, as described with reference to FIG. 2. The adaption value is used for compensating for a sensor offset and centring the sensor value at a predetermined level, preferably at or near zero. Thus, the adaption value shown in graph 302b is added so that the sensor value is brought back to the predetermined level, e.g., to bring the sensor value to zero. This is reflected in graph 302c which illustrates the compensated sensor offset, in other words, the compensated sensor offset in graph 302c is the sum of the adaption value in graph 302b and the sensor value in graph 302a.

At time t1, the sensor value, in graph 302a, starts to drift to higher values, i.e., a sensor offset appears. Consequently, the adaption value in graph 302b, become more negative at the same rate so that the compensated sensor offset in graph 302c is maintained at zero.

Accordingly, now turning to FIG. 4, in step S102, a sensor offset value being an offset from a sensor value measured with a differential pressure sensor 13 is determined. An example sensor value is shown in graph 302a where a deviation from zero is the sensor value offset.

In step S104, an adaption value is added to the measured sensor value to compensate for the offset value to centre the sensor value around a predetermined level, i.e., to compensate for the sensor offset. The adaption value is conceptually described in the graph 302b in FIG. 3. Until time t2, the adaption value properly compensates for the sensor offset from the sensor value in graph 302a. In other words, the compensated sensor offset value in graph 302c is centred at zero. Preferably, the predetermined level described herein is at or near zero.

A sum of a measured sensor value and the adaption value would, up to time t2, be relatively close to the predetermined level, at or near zero, at which the adaption value should centre the measured sensor value.

In step S106 in the flow-chart of FIG. 4, if a sum of a subsequently measured sensor value and the adaption value exceeds a limit value, it is concluded that the differential pressure sensor 13 has been replaced.

At time t2, a sensor replacement was performed. Here, the new sensor offset is zero as indicated in graph 302a after time t2. This leads to a sudden jump in the compensated sensor offset shown in graph 302c at time t2. Thus, at, or just after time t2, the sum of a subsequent measured sensor value and the adaption value would deviate from the sum at times before time t2, since the adaption value was adapted for the sensor values measured prior to t1. Here, after time t2, the sum of the measured sensor value and the adaption value is negative with a relatively large magnitude. If the sum exceeds the limit value, it is concluded that the differential pressure sensor has been replaced. In this case the sum is negative, thus, it may be the magnitude, or absolute value, of the sum that is compared to the magnitude, or absolute value, of the limit value for concluding whether the sensor has been replaced. Alternatively, the negative sum is compared to a negative limit value, whereby a sum having larger magnitude, i.e., being more negative, than the negative limit value indicates a sensor replacement.

A control unit 16, shown in FIG. 2, is configured to receive sensor data from the differential pressure sensor 13. The control unit 16 may continuously, determine a sum of a received sensor value indicating the present differential pressure across the filter 11 and the adaption value adapted to compensate for a sensor offset. If the control unit 16 determines that the sum exceeds the limit value, the control unit is configured to conclude, i.e., produce a signal indicative of that, the differential pressure sensor has been replaced.

Preferably, the herein proposed method is performed only when predetermined conditions of the vehicle 1 are fulfilled. The predefined conditions include at least one of that the vehicle engine 2 is off, the vehicle engine 2 is idle, a temperature of the filter is within a predetermined range, and that the ambient temperature is within a predetermined range. This ensures that the conditions during subsequent measurements are reproducible and that a measured the sensor offset is not affected by that the vehicle conditions are different between measurements.

Figure 5:
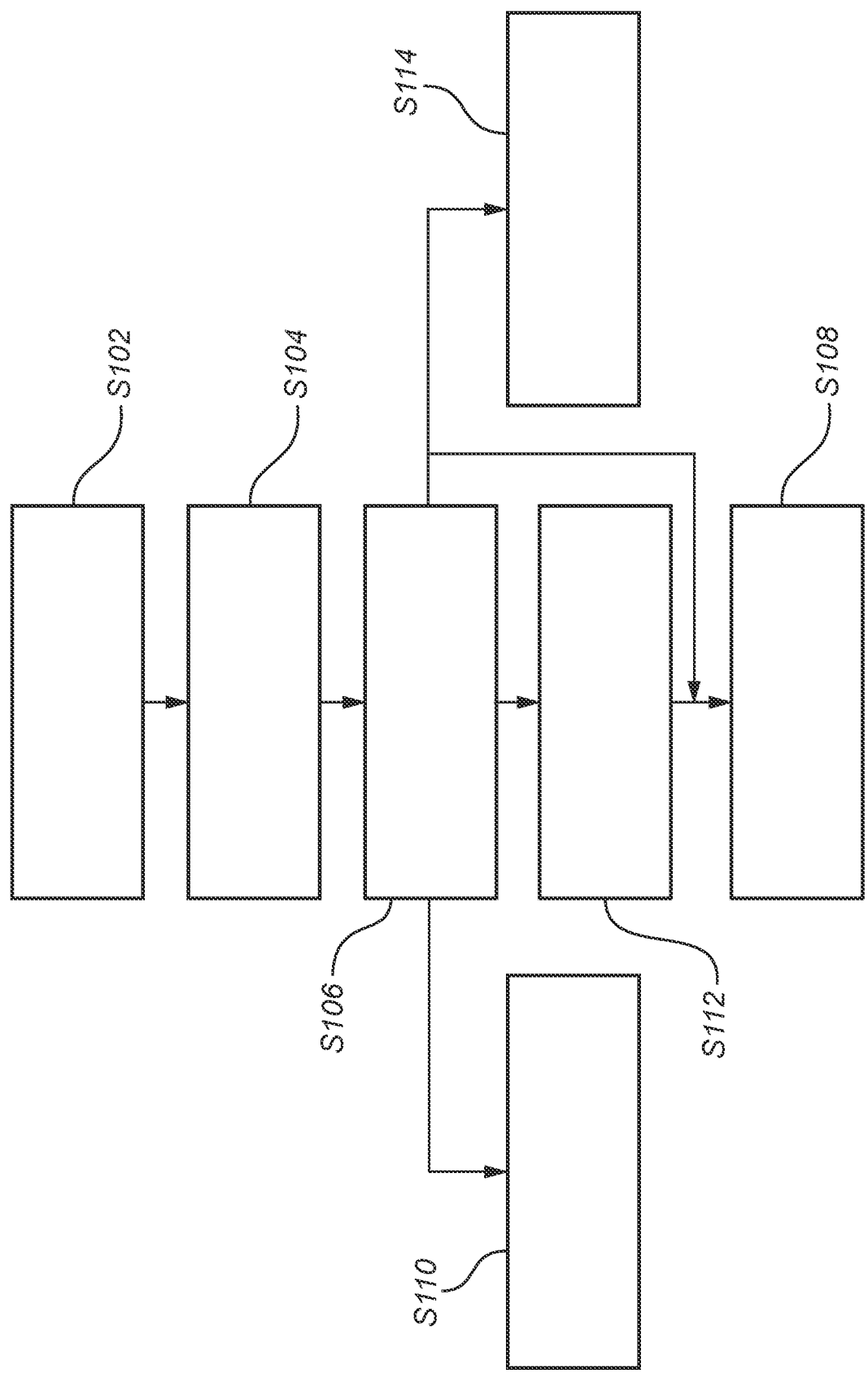
FIG. 5 is a flow-chart of method steps according to example embodiments of the invention.

Turning now to FIG. 5, the method may further comprise a step S108 including to, in response to concluding that the differential pressure sensor has been replaced, performing a reset of at least one software function affected by the pressure values measured by the differential pressure sensor. Thus, the control unit 16 may cause a reset of one or more software functions operative on one or more vehicle electrical control units of the vehicle 1. This reset may for example include to reset, or "zero", the adaption value. Turning to FIG. 3, graph 302b, the adaption value is brought back to zero immediately after time t2 when the sensor replacement is detected. Consequently, the compensated sensor offset is also brought back to zero when the adaption value is reset. This reflects a reset of the adaption value function of the vehicle being part of a sensor value offset compensation function.

Other example functions that may be reset, by the control unit 16, include a particulate filter soot or ash model, or an on-board diagnostic monitor function of the vehicle. A reset may relate to deleting historical data of a function of model. For example, historical data used for building the particulate soot or ash model may be deleted so that a new model may be built using the new differential pressure sensor. Another example is that diagnostics data related to the old sensor may be deleted. Generally, a reset is to set parameters of a function or model to its initial predefined values.

Further, in response to concluding that the differential pressure sensor has been replaced in step S106, pausing an operation of at least one of a particulate soot model function and the on-board diagnostic monitor function of the vehicle in step S110 until reset of the of at least one software function is completed. The control unit 16 that is performing the method to conclude whether a sensor has been replaced, may also be configured to pause any functions that are affected by measurements of the differential pressure sensor 11, until the sensor replacement is completed.

Further, in response to detecting that the sum of the subsequently detected sensor value and the adaption value exceeds the limit value, providing, in step S112 a signal to a user interface 18 indicative of that a differential pressure sensor replacement is detected, and triggering a request for confirmation of a differential pressure sensor replacement is provided. Thus, the control unit 16 may provide a signal to the user interface 18 that informs the user or technician that a new differential pressure sensor is detected. Simultaneously, the control unit 16 is configured to provide a signal for requesting that the user confirms that such replacement has been performed. The user may provide the confirmation via the user interface 18. A signal is provided to the control unit 16, via the user interface 18 indicating the confirmation of the sensor replacement. The user interface 18 may for example be a portable electronic device, a computer, a laptop, a tablet, etc. Various such interfaces are known per se and will not be discussed in detail herein.

In step S108, in response to receiving a confirmation of a differential pressure replacement in step S112, a reset of at least one software function affected by the pressure values measured by the differential pressure sensor is performed. The confirmation is received by the control unit 16 which sends a control signal to reset each of the software functions.

Further, the control unit 16 may store, in step S114, the adaption value in a memory 20, e.g., a non-transitory memory 20. In this way, a prior adaption values can be reused in case a new adaption value is based on incorrect data. This allows the adaption function to return to the prior adaption value.

A control unit may include a microprocessor, microcontroller, programmable digital signal processor or another programmable device. Thus, the control unit comprises electronic circuits and connections (not shown) as well as processing circuitry (not shown) such that the control unit can communicate with different parts of the truck such as the brakes, suspension, driveline, in particular an electrical engine, an electric machine, a clutch, and a gearbox in order to at least partly operate the truck. The control unit may comprise modules in either hardware or software, or partially in hardware or software and communicate using known transmission buses such as CAN-bus and/or wireless communication capabilities. The processing circuitry may be a general-purpose processor or a specific processor. The control unit comprises a non-transitory memory for storing computer program code and data upon. Thus, the skilled addressee realizes that the control unit may be embodied by many different constructions.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

It is to be understood that the present invention is not limited to the embodiments described above and illustrated in the drawings; rather, the skilled person will recognize that many changes and modifications may be made within the scope of the appended claims.

The invention claimed is:

1. A method for detecting a replacement of a differential pressure sensor arranged for measuring a differential pressure across a filter of an aftertreatment system of a vehicle, the method comprising:
    capturing particulates with the filter in a stream of combustion gas from a vehicle engine;
    measuring a pressure drop across the filter with the differential pressure sensor;
    determining a sensor offset value being an offset from a sensor value measured with the differential pressure sensor;
    adding an adaption value to the measured sensor value adapted to compensate for the offset value to centre the sensor value around a predetermined level;
    in response to a sum of a subsequently measured sensor value and the adaption value exceeding a limit value, concluding that the differential pressure sensor has been replaced.

2. The method according to claim 1, performed once predefined conditions of the vehicle are fulfilled.

3. The method according to claim 2, wherein the predefined conditions include at least one of that the vehicle engine is off, the vehicle engine is idle, a temperature of the filter is within a predetermined range, and that the ambient temperature is within a predetermined range.

4. The method according to claim 1, comprising, in response to concluding that the differential pressure sensor has been replaced, performing a reset of at least one software function affected by the pressure values measured by the differential pressure sensor.

5. The method according to claim 4, wherein the at least one software function comprises at least one of a sensor adaption function configured to perform sensor value offset compensation, a particulate filter soot or ash model, or an on-board diagnostic monitor function of the vehicle.

6. The method according to claim 4, comprising, in response to concluding that the differential pressure sensor has been replaced, pausing an operation of at least one of a particulate filter soot or ash model and the on-board diagnostic monitor function of the vehicle until reset of the of at least one software function is completed.

7. The method according to claim 1, comprising, in response to detecting that the sum of the subsequently detected sensor value and the adaption value exceeds the limit value, providing a signal to a user interface indicative of that a differential pressure sensor replacement is detected, and triggering a request for confirmation of a differential pressure sensor replacement.

8. The method according to claim 7, in response to receiving a confirmation of a differential pressure sensor replacement, performing a reset of at least one software function affected by the pressure values measured by the differential pressure sensor.

9. The method according to claim 1, comprising storing the adaption value in a memory.

10. The method according to claim 1, wherein the predefined level is at or near zero.

11. A computer program comprising program code for performing the steps of claim 1 when said program is run on a computer.

12. A computer readable medium carrying a computer program comprising program code for performing the steps of claim 1 when said program product is run on a computer.

13. A control unit for detecting a replacement of a differential pressure sensor, the control unit being configured to perform the steps of the method according to claim 1.

14. An exhaust aftertreatment system of a vehicle comprising:
    a particulate filter configured to capture particulates in a stream of combustion gas from a vehicle engine;
    a differential pressure sensor arranged to measure a pressure drop across the particulate filter; and,
    a control unit configured to detect a replacement of the differential pressure sensor by determining a sum of a measured sensor value and an adaption value adapted to compensate for an offset sensor value to centre a measured sensor value around a predetermined level, wherein if the sum exceeds a limit value, the control unit is configured to conclude that the differential pressure sensor has been replaced.

15. A vehicle comprising an exhaust aftertreatment system according to claim 14.

* * * * *